July 15, 1958  W. V. KENNEDY  2,843,268
COMBINED FULL-FLOW AND PART-FLOW OIL FILTERS
Filed Aug. 5, 1955
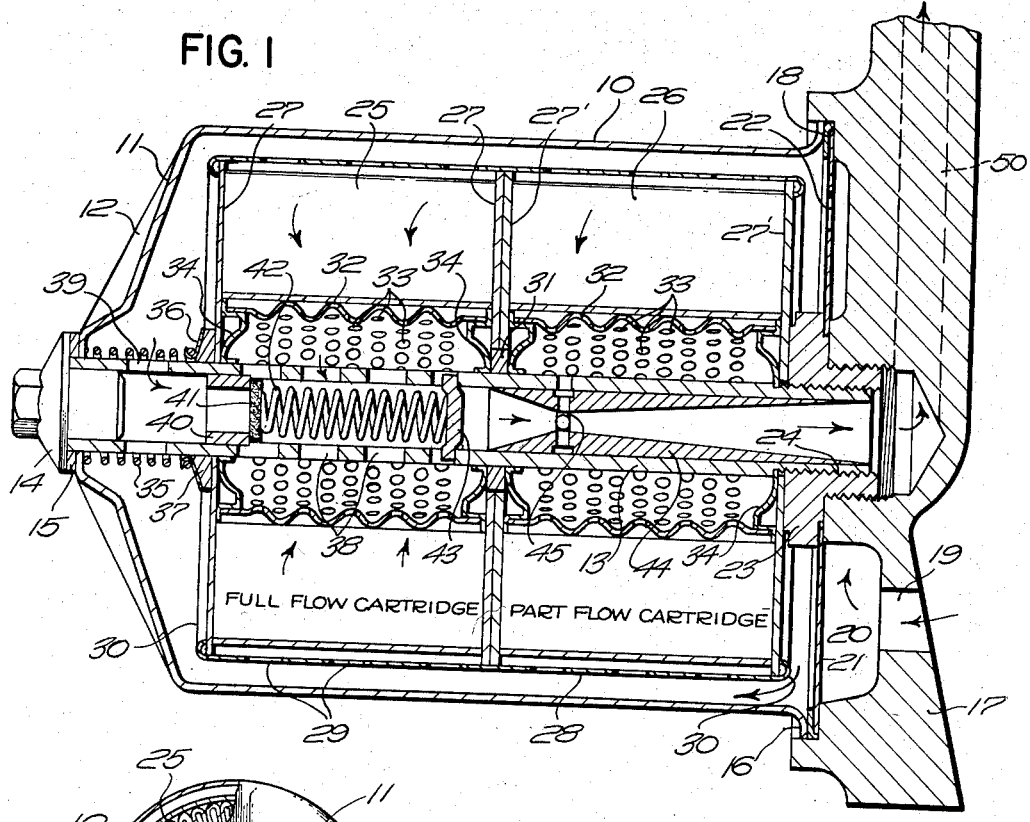
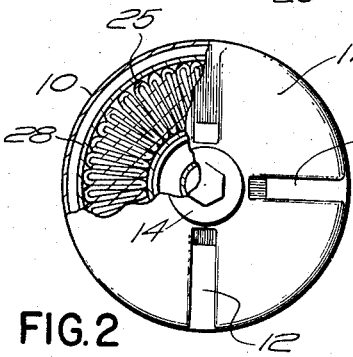
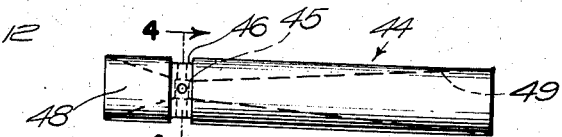
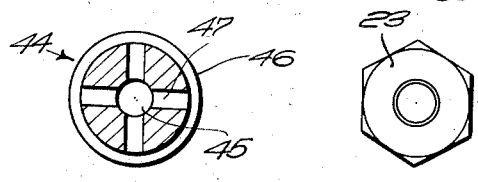  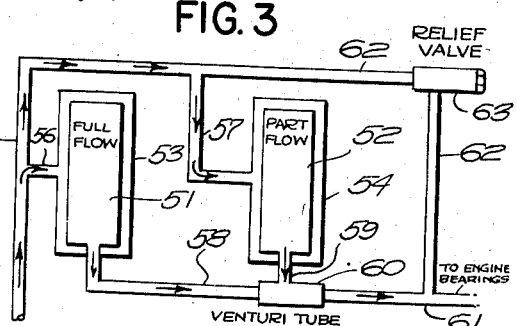
INVENTOR.
WALTER V. KENNEDY
BY
Charles C. Willson
ATTORNEY

United States Patent Office 2,843,268
Patented July 15, 1958

2,843,268

COMBINED FULL-FLOW AND PART-FLOW OIL FILTERS

Walter V. Kennedy, Central Falls, R. I., assignor to Fram Corporation, Providence, R. I., a corporation of Rhode Island Application August 5, 1955, Serial No. 526,755

3 Claims. (Cl. 210—295)

This invention relates to oil filters, and more particularly to oil filters of the type that employs at the same time a full-flow and a part-flow cartridge to filter the lubricating oil of motor vehicles.

In combined full-flow and part-flow filters it has been the general practice heretofore to deliver the stream of oil from the full-flow cartridge to the engine bearings and to return the much smaller stream of oil from the part-flow cartridge to the oil sump. This has made it necessary to provide two outlets from the filter shell, one for the oil from the full-flow cartridge and the other for the oil from the part-flow cartridge. The oil from the full-flow cartridge needs to be delivered to the engine bearings under sufficient pressure to force the oil through the bearings. The oil from the part-flow cartridge has heretofore been returned to the oil sump under approximately atmospheric pressure.

The present invention contemplates a combined full-flow and part-flow filter which is so constructed that the oil from the part-flow cartridge is combined with the stream of oil from the full-flow cartridge, so that the oil from both cartridges is delivered directly to the engine bearings or other mechanism to be lubricated. This causes the very clean oil from the part-flow cartridge to be supplied directly to the engine bearings, which is believed much more desirable than returning it directly to the sump as heretofore. It also eliminates the necessity of providing a filter shell with two outlets, one for the stream from the full-flow cartridge and the other for the stream from the part-flow cartridge, as has been the usual practice.

It was considered impractical heretofore to deliver the oil from the two cartridges into the same stream, because the pressure drop across the part-flow cartridge is much higher than the pressure drop across the full-flow cartridge, and as a result practically no oil would flow through the high pressure cartridge into the stream of oil from the low pressure cartridge.

This difficulty is overcome in accordance with the present invention by employing a venturi tube through which the stream of oil from the full-flow cartridge is forced, so as to cause a substantial pressure drop around the venturi tube and at the downstream side of the part-flow cartridge, and thereby draw oil through the part-flow cartridge into the stream of oil from the full-flow cartridge. This combined stream is delivered directly to the parts to be lubricated; and while such stream will, in most cases, contain only a small percent of oil from the part-flow cartridge, the entire supply of oil will in time be passed through the part-flow cartridge and freed of all dirt particles larger than a few microns in size.

The present invention, therefore, resides primarily in a combined full-flow and part-flow filter constructed so that the oil that flows through the two cartridges forms a single stream that is delivered to the engine bearings, and provided with a venturi tube arranged so that the oil from the full-flow cartridge passes therethrough and causes a pressure drop that helps to draw oil through the part-flow cartridge.

The above and other features of the present invention will be further understood from the following description when read in connection with the accompanying drawing wherein:

Fig. 1 is a longitudinal central section through a combined full-flow and part-flow oil filter embodying the construction of the present invention.

Fig. 2, on a smaller scale, is an end view of Fig. 1, parts being broken away to show the pleated cartridge in the shell.

Fig. 3 is a side view of a sleeve which forms a venturi tube.

Fig. 4 is a transverse sectional view taken on the line 4—4 of Fig. 3.

Fig. 5 is an end view of an adaptor nut shown in Fig. 1; and

Fig. 6 is a diagram illustrating a modified construction employing a full-flow and part-flow cartridge and a venturi tube for promoting the flow of oil through the part-flow cartridge.

The oil filter illustrated in Figs. 1 and 2 of the drawing is shown as mounted directly upon the metal casing forming an integral portion of an internal combustion engine, and has its longitudinal axis extending in a horizontal direction. It will be understood, however, that this is not essential and that the oil filter shown may if desired be mounted with its axis at any desired angle to a horizontal plane.

The oil filter illustrated in Figs. 1 to 5 inclusive comprises a cup-shaped shell 10 formed of sheet metal drawn to the shape shown. The shell has an upper end 11 of approximately conical shape and is provided with the stiffening ribs 12. This shell is mounted upon the center tube 13, which has rigidly secured thereto the enlarged head 14 that is adapted to receive a wrench to screw the center tube into supporting means. A gasket 15 is confined between the underface of the head 14 and the outer face of the shell end 11 where it surrounds the center tube. At the opposite end of this cup-shaped shell 10 is provided an outwardly extending flange 16.

In the construction shown the shell 10 is secured directly to the engine casting 17, the face of which casting is provided with an annular recess adapted to receive a gasket 18 upon which the annular flange 16 is seated as shown. The casting 17 is provided with a passage 19 through which oil is forced by the oil pump into the chamber 20. Disposed over this chamber, in the construction, is a disc 21 which is clamped between the gasket 18 and the face of the casting 17, and this disc constitutes an anti-flow disc that prevents the oil from draining out of the filter when the oil pump is not operating. This disc has formed therethrough near its upper edge the oil passage 22. The arrangement is such that oil must rise to the level of this hole 22 to pass into or out of the filter. If, however, the filter of the present invention extends in a vertical direction rather than horizontal, some other type of anti-flow device should be employed.

In the construction shown the casting 17 is provided with a threaded hole adapted to have screwed therein the adaptor nut 23, the outer end of which nut is shown in Fig. 5. This nut serves to clamp the anti-flow disc 21 firmly against the casting 17, and this nut is internally threaded to receive the threaded inner end 24 of the center tube 13. The arrangement is such that when this center tube is screwed tightly into place it forces the flanged portion 16 of the shell 10 into firm seating engagement with the gasket 18, and causes the head 14 to exert sealing pressure against the gasket 15 so that the shell will not leak even when oil is forced into the same under high pressure.

The center tube is shown as having mounted thereon a full-flow cartridge 25 and a part-flow cartridge 26, and such cartridges may be formed of pleated paper in a well-known manner and as shown in Fig. 2; or other desired types of cartridges may be employed. The pleated cartridge 25 has secured to each end thereof in sealing engagement with the ends of the pleats the closure discs 27, and the pleated cartridge 26 is provided with the similar closure discs 27'. These two cartridges are preferably held in alignment with each other with one disc abutting against the other, as shown, by a surrounding metal shell 28, which is provided with the apertures 29 through which oil may pass; and the ends of this shell are folded inwardly in contacting engagement with the end discs 27 and 27', as indicated at 30, to thereby clamp the two cartridges in the assembled relation in which they are shown. A gasket 31 may be provided around the center tube 13 within the contacting discs 27, 27'.

The pleated annular filter elements 25 and 26 each surrounds a reinforcing tube 32 which may be formed of metal and may be corrugated as shown and is provided with the numerous apertures 33 through which oil can flow. These tubes 32 are held properly centered with respect to the center tube 13 by metal discs 34 disposed at each end of the tubes and which abut against the inner face of the discs 27 of the cartridge 25 and against the inner face of the discs 27' of the cartridge 26.

In the construction shown the end disc 27' of the part-flow cartridge 26 is held firmly seated upon the outer face of the adaptor nut 23 by the pressure exerted by a coil spring 35. This spring is confined between the inner face of the shell head 11 and a metal sleeve 36 that engages a gasket 37 and holds the same firmly pressed against the outer end 27 of the cartridge 25 to thereby prevent oil from entering the area around the center tube at this end of the cartridge. The center tube is shown as provided with the holes 38 through which oil that has passed inwardly through the cartridge 25 can enter the bore of this center tube. The center tube is shown as having a by-pass valve adapted to allow oil to by-pass the cartridge 25 when it becomes clogged and enter the center tube. To this end the center tube is provided with the holes 39 through which oil may pass as indicated by the arrow, and inside of this tube is rigidly secured a sleeve 40 constructed to provide at its inner end a seat for a closure disc 41, which disc is normally held seated against the inner end of this sleeve as shown by a coiled spring 42, one end of which abuts against this disc and the other rests against a transversely extending pin 43 that lies in drill holes formed through the center tube.

The construction so far described was known prior to the present invention and has been shown and described to make clear the operation of the features of the present invention, which will now be described, and whereby oil which surrounds the part-flow cartridge 26 is caused to flow through this cartridge and enter the oil stream from the full-flow cartridge 25.

In the construction shown the center tube 13 has tightly fitted in the bore thereof which is surrounded by the cartridge 26 a tubular member 44 which is constructed to form a venturi tube that constitutes an important part of the present invenion. This tubular member is provided with a small throat 45 and with an annular groove 46 that surrounds the throat 45 and is connected thereto by the radially disposed holes 47, as best shown in Fig. 4. This tubular member 44 is provided at each end thereof with a tapered bore as shown, and wherein the tapered bore 48 has its walls converging towards the throat 45, whereas the tapered walls 49 diverge from such throat. Each of these tapers should be formed in accordance with well-known practice in the construction of venturi tubes, so that as oil from the full-flow cartridge flows in the direction indicated by the arrows, it will be retarded by the tapered walls 48 until the throat 45 is reached, whereupon it will rush rapidly through this throat.

The construction of the venturi tube is such that the oil which passes through the full-flow cartridge 25 into the center bore of the tube 13 will pass through the throat of the venturi tube under sufficient speed to cause a substantial drop in pressure in the annular passage 46 surrounding the tubular member 44. This will reduce the pressure within the tube 32 that is surrounded by the pleated filter member 26 of the part-flow cartridge, so that this drop in pressure will help to draw oil through the part-flow cartridge into the oil stream flowing from the full-flow cartridge. This combined oil stream upon leaving the inner end of the center tube 13 enters the bore 50 formed in the casting 17 and which leads to the engine bearings to be lubricated. In this manner oil that has passed through both cartridges is delivered directly to the engine bearings.

The flow through the part-flow cartridge 26 will depend largely upon the pressure differential between its opposite sides, and the flow will increase as this differential increases. Therefore, the size of the throat 45 of the venturi tube should be small enough to cause a substantial pressure drop in the annular groove 46, but it should not be so small that it will prevent an adequate amount of oil from reaching the engine bearings under sufficient pressure to properly lubricate such bearings.

While the by-pass valve 41 is herein shown and described as placed in the center tube 13, it may be desirable in some cases to so position such relief valve that when it is forced open it will by-pass both the cartridge 25 and the venturi tube.

To further illustrate the operation of the venturi tube as employed in carrying out the present invention, it might be pointed out that the pressure drop across the full-flow cartridge 25, under normal working conditions when it is relatively clean, may be approximately five pounds per square inch, and the relief valve 41 may be set to open at approximately eight pounds to by-pass the cartridge 25 should it become clogged. The pressure drop across the part-flow cartridge is much higher and may be several times that of the full-flow cartridge, under normal operating conditions. It will, therefore, be apparent that in the present construction wherein the streams of oil from both cartridges are combined and the combined stream is delivered to the engine bearings under considerable pressure, very little oil would flow through the part-flow cartridge because it is much more difficult for the oil to flow through this cartridge than through the full-flow cartridge. To overcome this difficulty the venturi tube above described is employed so as to produce a substantial drop in pressure at the downstream side of the part-flow cartridge to thereby increase substantially the flow of oil through this cartridge. As a result, the stream of oil being delivered to the engine bearings will contain an appreciable amount of oil which has passed through the part-flow cartridge and is freed of dirt down to the size of a few microns. Under the conditions just mentioned, oil is pumped through the cartridges at the rate of, say, two or three gallons per minute, and all oil contained in the crankcase will gradually be forced through the part-flow cartridge and thoroughly cleaned by this cartridge. As above stated, this thoroughly cleaned oil is delivered directly to the engine bearings rather than returned to the oil sump as heretofore.

The construction above described constitute one embodiment of the present invention. Various other embodiments employing a venturi tube as above described may be used. One such modified embodiment is illustrated in Fig. 6 wherein a full-flow cartridge 51 and a part-flow cartridge 52 are employed; but these are not mounted in the same shell as shown in Fig. 1, but the cartridge 51 is mounted in a shell 53 and the cartridge 52 is mounted in a separate shell 54. Oil from the pressure pump is supplied to both of these shells by a pipe line 55 which is connected to the shell 53 by the extension 56 and to the shell 54 by the extension 57 so that oil will 52 is mounted in a separate shell 54. Oil from the pres- has passed through the full-flow cartridge leaves the shell 53 through the pipe 58. Oil from the shell 54 after passing through the part-flow cartridge 52 leaves the shell through the pipe connection 59 to enter a sleeve 60 which sleeve contains a venturi tube that is constructed to operate similarly to the venturi tube 44 above described. The arrangement is such that the stream of oil from the full-flow cartridge 51 passes through the venturi tube so as to reduce the pressure of oil at the inner face of the part-flow cartridge 52 to thereby increase the flow of oil through this cartridge, and cause this oil to enter the stream from the full-flow cartridge 51 to pass on to the engine bearings through the pipe 61. In this manner oil from both cartridges is delivered direct to the engine bearings or other mechanism to be lubricated.

Should the full-flow cartridge 51 become clogged, oil from the pump can by-pass the filters 53 and 54 and the venturi tube at 60, and flow through the pipe line 62 to the discharge pipe 61. The pipe line 62 is provided with the adjustable relief valve 63.

Having thus described my invention, what I claim and desire to protect by Letters Patent is:

1. Oil filter apparatus provided with a full-flow cartridge and a part-flow cartridge arranged so that both cartridges are subjected to substantially the same upstream oil pressure, a discharge passage for the filtered oil from the first cartridge, a separate discharge passage for the filtered oil from the second cartridge, a venturi tube connected to the first passage so that oil discharged from such passage through this tube will produce a suction action, and means for subjecting the interior of the second discharge passage to this suction action, whereby oil is drawn through the part-flow cartridge and into the stream of oil from the full-flow cartridge.

2. A combined full-flow and part-flow filter, comprising a filter shell provided with a full-flow cartridge and a part-flow cartridge both of the outside-in-flow type and arranged to be subjected to substantialy the same upstream liquid pressure, a center passage for the filtered liquid from the first cartridge and a separate center passage for the filtered liquid from the second cartridge, a venturi tube connected to the first passage so that liquid discharged from such passage through this tube will produce a suction action, and means for subjecting the interior of the second discharge passage to this suction action, whereby liquid is drawn through the part-flow cartridge and into the stream of liquid from the full-flow passage.

3. An oil filter, comprising a shell having an inlet to receive oil under pressure and a center tube in the shell forming an oil outlet, a coarse filter cartridge and a fine filter cartridge both of the outside-in flow type and mounted on the center tube in alignment one with the other, a partition that sealingly engages the tube between the cartridges so that the flow from the coarse cartridge must enter a different portion of the tube from that of the flow from the fine cartridge, and a venturi tube arranged so that the flow from the coarse cartridge passes therethrough and produces suction to draw oil through the fine cartridge to increase the flow through the fine cartridge and commingle the oil from both cartridges.

References Cited in the file of this patent

UNITED STATES PATENTS

| | | |
|---|---|---|
| 723,858 | Gary | Mar. 31, 1903 |
| 2,407,190 | Tait | Sept. 3, 1946 |
| 2,559,267 | Winslow | July 3, 1951 |